United States Patent [19]
Wolff

[11] 3,946,897
[45] Mar. 30, 1976

[54] DRUM COVER MADE FROM THERMOPLASTIC RUBBER

[75] Inventor: Anthony P. Wolff, Cheshire, Conn.

[73] Assignee: Uniroyal, Inc., New York, N.Y.

[22] Filed: Mar. 25, 1974

[21] Appl. No.: 454,355

[52] U.S. Cl. ......... 220/306; 260/42.33; 260/897 A; 206/503; 260/42.46; 206/509
[51] Int. Cl.² .......................................... C08L 23/16
[58] Field of Search ...... 260/897 A, 42.46; 206/503

[56] References Cited
UNITED STATES PATENTS

| | | | |
|---|---|---|---|
| 2,957,601 | 10/1960 | Novick | 220/97 |
| 3,317,087 | 5/1967 | Landis | 222/143 |
| 3,758,643 | 9/1973 | Fischer | 260/897 A |

*Primary Examiner*—Carman J. Seccuro
*Attorney, Agent, or Firm*—James J. Long

[57] ABSTRACT

A cover for a drum made of a thermoplastic elastomeric blend of poly-alpha-olefin plastic (e.g., polypropylene, 40%) with EPM or EPDM (e.g., ethylene-propylene-5-ethylidene-2-norbornene terpolymer, 60%).

4 Claims, 5 Drawing Figures

U.S. Patent  March 30, 1976  3,946,897
Fig.1.
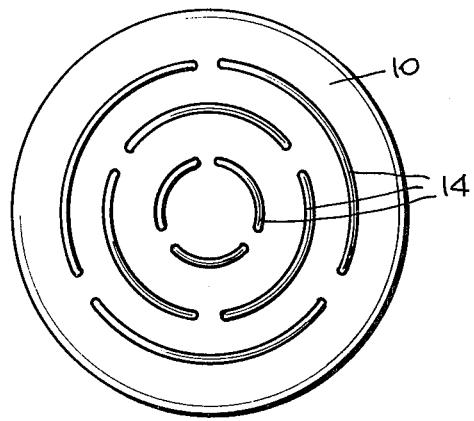
Fig.4.
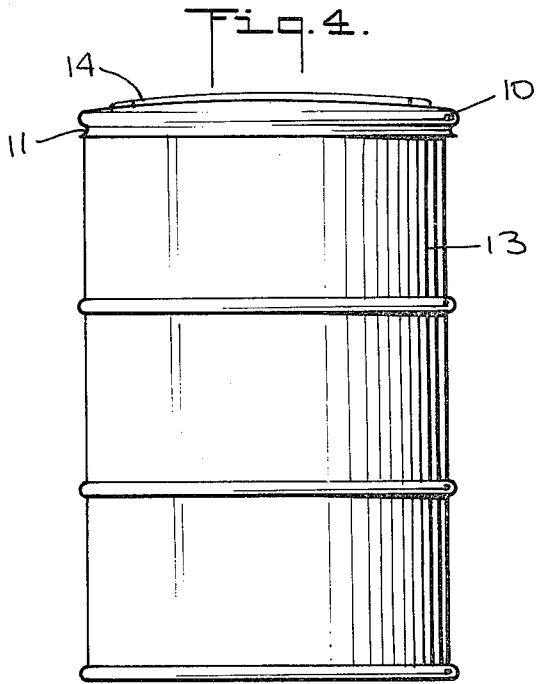
Fig.2.
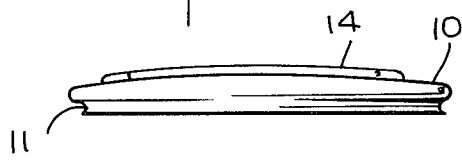
Fig.5.
Fig.3.
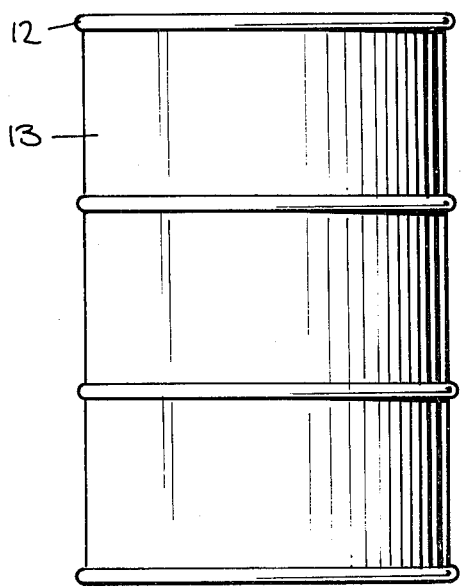
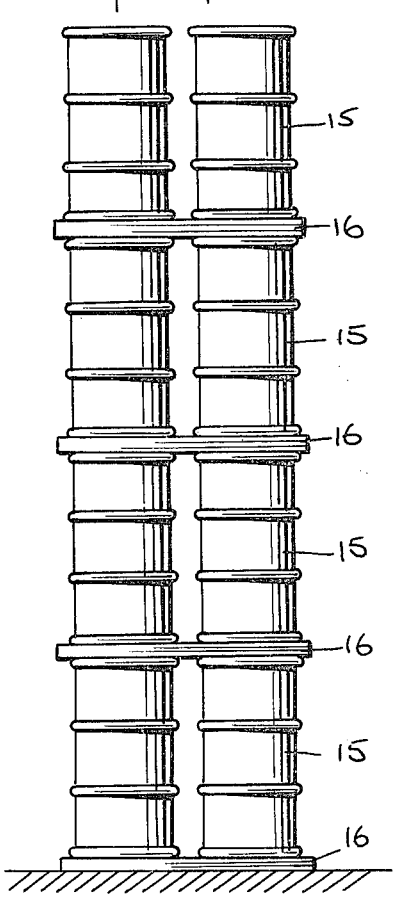

DRUM COVER MADE FROM THERMOPLASTIC RUBBER

This invention relates to a drum cover.

The storage of drums, such as the conventional 55 gallon steel shipping and storage drums commonly used in the chemical and allied industries, gives rise to certain problems, especially outdoors where dirt and water tend to accumulate on the top of the drum and weathering and rusting soon cause partial if not total eradication of information commonly stenciled on the drum head, such as identification of contents and batch numbers. Frequently after a period of outdoor storage, especially in inclement weather, the drum heads must be cleaned and repainted with reapplication of necessary information before the drums can be shipped. This occasions delays, inconvenience, and expense.

It has been proposed to forestall the foregoing difficulties by protecting the head of the drum with a removable drum cover. Thus, drum covers made from plastics such as polyethylene have been proposed but unfortunately known plastic covers are not only unable to withstand the effects of outdoor conditions such as changes in temperature and ultraviolet radiation, but they also inadequately resist the high static and abrasive forces inevitably encountered when drums are moved about or stacked, often in layers of two or more, as on pallets. Damage to these covers defeated their protective purpose after very few uses and in many instances rendered them useless the very first time of application. Frequently such failure occurred at the chine of the drum which is most exposed to the abrasive and static forces.

In addition, elastomeric drum covers made from butadiene-styrene rubber or natural rubber exhibit low resistance to static force and weather and are therefore not commonly used.

Metallic drum covers are frequently employed, but several drawbacks are encountered with them. If the covers are made from steel, rusting and subsequent leakage of water and dirt onto the drum top are encountered. Covers made from metals less prone to corrosion, e.g. aluminum, usually are considerably more durable but expensive. Besides providing only limited sealing when deformed, all metal covers create serious hazards: pallets may slide easily off their smooth and slippery surface when stacked on uneven ground, possibly endangering personnel nearby, not to mention spilling of flammable contents from ruptured drums.

The invention provides a greatly improved drum cover that unexpectedly alleviates the above mentioned deficiencies and combines a number of advantages, namely, excellent durability under heavy use, exceptional weatherability, non-slip characteristics, chemical inertness, prolonged reusability even after exposure to heavy loads, light weight as well as sufficient elasticity to ensure a snug seal on the drum head.

In accordance with the invention, a drum cover is made from a thermoplastic elastomer which is a blend of from 50 to 10% by weight of a poly-alphaolefin plastic (e.g., polyethylene or polypropylene) with correspondingly 50 to 90 % by weight of a rubbery copolymer of ethylene and propylene, with or without a copolymerizable non-conjugated diene (e.g., 5-ethylidene-2-norbornene, dicyclopentadiene, 1,4-hexadiene, etc.), known as EPM or EPDM. Such thermoplastic elastomeric blends are disclosed in U.S. Pat. No. 3,758,643, Sept. 11, 1973, and applications Ser. No. 171,328, filed Aug. 12, 1971, now U.S. Pat. No. 3,806,558, issued Apr. 23, 1974, and Ser. No. 284,521, filed Aug. 29, 1972, now U.S. Pat. No. 3,835,201, issued Sept. 10, 1974, of W. K. Fischer, the disclosures of which are hereby incorporated herein by reference.

The invention will be described with reference to the accompanying drawings, wherein:

FIG. 1 is a top view of a drum cover of the invention;

FIG. 2 is an edge view of the drum cover;

FIG. 3 is an elevational view of a drum for use with the drum cover;

FIG. 4 is an elevational view of the drum with the drum cover mounted in place thereon; and, FIG. 5 is an elevational view on a smaller scale of a stack of covered drums on pallets.

Referring to the drawing, the drum cover 10 of the invention is a disc or dish-shaped plate-like object having a peripheral downwardly extending lip 11 adapted to engage the upper rim 12 of a drum 13 frictionally to make a snug, effective seal therewith by reason of the elastomeric nature of the drum cover which permits the lip to stretch over the drum rim as the cover is fitted onto the drum (FIG. 4) and then retract to make a tight seal. Generally concentric arcuate ridges 14 formed on the upper surface of the drum cover serve to stiffen and reinforce the cover and resist sliding. In use, a number of covered drums 15 (FIG. 5) are commonly stacked on pallets 16 for storage or shipment.

An example of a thermoplastic elastomeric blend suitable for use in the invention is the material made by masticating, in a Banbury mixer, 40 parts of polypropylene (melt flow index 4, specific gravity 0.903), 60 parts of EPDM (unsaturated terpolymer; 47.5% ethylene, 47.5% propylene, 5% dicyclopentadiene), and 0.6 part of 2,5-bis(tert.-butylperoxy)-2,5-dimethylhexane for 7 minutes at 370°F as described in Example 4 (Run 35) of Ser. No. 171,328. The mixture further contains about 0.25% carbon black as a pigment and ultraviolet light screening agent. Typical characteristics are:

| | | |
|---|---|---|
| Specific gravity | 0.88 | |
| Shore A hardness | 92 | |
| Abrasion resistance, g/Kc | 0.4 | (ASTM D-1044) |
| NBS index | 110 | (D-1630) |
| Tensile strength, psi | 2000 | (D-412) |
| Elongation at break, % | 300 | (D-412) |

The formulation may further include other colorants (pigments), stabilizers, processing aids, etc. if so desired in appropriate small quantities.

The mixture may be shaped into the form of a drum cover by any suitable conventional method, such as by extrusion or calendering of a sheet which is thereafter vacuum formed, or the cover may be shaped by compression, injection or blow molding.

The thickness of the cover stock ranges from about 0.025 to 0.100 inch, usually 0.040 to 0.060 inch although higher or lower thickness may be used if so desired. Below about 0.025 inch thickness the durability of the drum cover may be considerably reduced, whereas above 0.100 inch the cost of the cover may become too high with essentially no real improvement in durability.

A number of drum covers were made from a sheet of the above-described material about 36 by 0.050 inches, extruded under the following conditions:

| | |
|---|---|
| Compression ratio | 2.5/1 |
| Screw RPM | about 15 |
| Barrel: | |
| throat temp. | cool |
| rear temp. | 375°F |
| center temp. | 400°F |
| head temp. | 420°F |
| die temp. | 435°F |
| Stock temp. | 435°F |

Pieces of the stock 36 by 36 inches square were mounted on a sheet holder, and heated to a pliable sagging state (about 325°F) using heat lamps, then vacuum formed on a cold mold. After cooling to a temperature sufficiently low to maintain structural stability (about 290°F) the pieces were removed from the mold and excess material was die cut off leaving a 1 inch edge. The resulting drum covers fitted tightly over the tops of drums which were stored outdoors, and subjected to severe weather conditions (sun, rain, snow, sleet) for a number of weeks. Covers were moved from one drum to another from time to time to simulate reuses. Drums were stored on pallets, subjecting the covers to pressures up to 6,000 pounds. The average life span of the covers was in excess of 30 reuses before pin holes developed. Snow and ice quickly broke away from the drum cover once it was flexed. No moisture was observed to collect in the drum heads and the painting and markings remained in original condition thus indicating good protection to the complete top head and bungs. The covers resist punctures and abrasion, weathering and ultraviolet radiation (Whetherometer and Fadeometer aging) and have excellent chemical resistance to water and inorganic acids and bases, and low molecular polar organic compounds. These include oxygen derivatives of hydrocarbons such as ketones, alcohols, aldehydes, esters and carboxylic acids. Also, amines and amides essentially do not chemically affect the covers. The covers maintain their flexibility down to −50°F and exhibit high retention of physical properties, especially hardness, at elevated temperatures up to 300°F. The covers exhibit true rubber feel, traction, resilience, flexibility, elongation set, and compression set properties.

I claim:

1. A removable, elastic, protective drum cover comprising a disc made of a thermoplastic elastomer which is a blend of from 50 to 10% by weight of a poly-alpha-olefin plastic and correspondingly from 50 to 90% by weight of a rubbery copolymer of ethylene and propylene with or without a copolymerizable non-conjugated diene, said disc having a peripheral lip adapted to stretch over and frictionally engage the end of a drum and then retract snugly to form an effective protective seal therewith while remaining removable from the drum, thereby protecting the complete head of the drum from dirt and adverse atmospheric influences, the said cover providing non-slip characteristics, and being capable of withstanding pressures up to 6000 pounds while retaining the ability to protect the head of the drum, the said cover being durable and movable from one drum to another to provide at least 30 reuses of the cover.

2. A drum cover as in claim 1 having a plurality of raised concentric ridges on the upper surface thereof.

3. A drum cover as in claim 1 in which the said blend is a blend of polypropylene plastic with ethylene-propylene-non-conjugated diene elastomer.

4. A drum cover as in claim 3 in which the blend contains a small amount of carbon black.

* * * * *